United States Patent
Gander

(10) Patent No.: US 10,345,438 B2
(45) Date of Patent: Jul. 9, 2019

(54) DETERMINING DISTANCE TO SOURCE OF PASSIVE INTERMODULATION PRODUCT (PIM) IN A DISTRIBUTED BASE STATION

(71) Applicant: CommScope Technologies LLC, Hickory, NC (US)

(72) Inventor: Martial Germain Gander, Springfield, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/709,264

(22) Filed: Sep. 19, 2017

(65) Prior Publication Data

US 2018/0081047 A1 Mar. 22, 2018

Related U.S. Application Data

(60) Provisional application No. 62/396,570, filed on Sep. 19, 2016.

(51) Int. Cl.
G01S 11/02 (2010.01)
H04B 1/10 (2006.01)
H04B 17/00 (2015.01)
H04B 17/10 (2015.01)
H04B 17/27 (2015.01)

(52) U.S. Cl.
CPC .......... G01S 11/023 (2013.01); H04B 1/1027 (2013.01); H04B 17/0085 (2013.01); H04B 17/101 (2015.01); H04B 17/27 (2015.01); H04B 17/102 (2015.01); H04B 17/103 (2015.01); H04B 17/104 (2015.01)

(58) Field of Classification Search
CPC ..................................................... G01S 5/0215
See application file for complete search history.

(56) References Cited

U.S. PATENT DOCUMENTS

| | | | |
|---|---|---|---|
| 7,872,583 B1 * | 1/2011 | Yushkov | G01S 5/0205 235/375 |
| 8,058,880 B2 | 11/2011 | Bradley et al. | |
| 8,410,786 B1 | 4/2013 | Bradley | |
| 8,593,158 B1 | 11/2013 | Bradley et al. | |

(Continued)

OTHER PUBLICATIONS

An et al., "Ideal Sequence Design in Time-Frequency Space—Applications to Radar, Sonar, and Communication Systems", "Applied and Numerical Harmonic Analysis", 2009, pp. Cover-xii, 51-55, Publisher: Birkhauser Boston.

(Continued)

*Primary Examiner* — Cindy Trandai
(74) *Attorney, Agent, or Firm* — Fogg & Powers LLC

(57) ABSTRACT

A method for determining the distance to source of a passive intermodulation (PIM) product for a distributed base station is provided. The method includes generating a test signal; transmitting the test signal on a front haul communication link between a baseband unit and a remote radio head of the distributed base station; receiving the PIM product as a reflected signal at the remote radio head; multiplying the reflected signal by a conjugate of the test signal to create a sinewave; determining a frequency of the sinewave; and determining the distance to the source of the PIM based on the determined frequency of the sinewave.

13 Claims, 10 Drawing Sheets

(56) References Cited

U.S. PATENT DOCUMENTS

| | | | |
|---|---|---|---|
| 8,666,322 B1* | 3/2014 | Bradley | H04B 17/11 |
| | | | 324/612 |
| 8,837,558 B1* | 9/2014 | Rao | G01S 5/0215 |
| | | | 375/152 |
| 8,903,324 B1 | 12/2014 | Bradley | |
| 9,014,052 B2 | 4/2015 | Gravely et al. | |
| 9,176,180 B1 | 11/2015 | Bradley et al. | |
| 9,588,212 B1 | 3/2017 | Bradley | |
| 9,699,607 B2* | 7/2017 | Markhovsky | G01S 3/46 |
| 9,768,812 B1* | 9/2017 | Tsui | H04B 1/109 |
| 9,813,867 B2* | 11/2017 | Prevatt | H04W 4/023 |
| 9,913,244 B2* | 3/2018 | Markhovsky | H04W 64/006 |
| 9,955,301 B2* | 4/2018 | Markhovsky | H04W 4/90 |
| 2004/0036943 A1* | 2/2004 | Freund | B82Y 20/00 |
| | | | 359/240 |
| 2012/0249360 A1* | 10/2012 | Kanamoto | G01S 3/74 |
| | | | 342/158 |
| 2012/0283987 A1* | 11/2012 | Busking | G01S 13/82 |
| | | | 702/159 |
| 2012/0313809 A1* | 12/2012 | Testar | G01S 7/292 |
| | | | 342/118 |
| 2014/0146866 A1* | 5/2014 | Strachan | H04B 17/309 |
| | | | 375/226 |
| 2014/0198684 A1* | 7/2014 | Gravely | H04W 24/02 |
| | | | 370/254 |
| 2014/0229133 A1* | 8/2014 | Sahinoglu | G01R 23/02 |
| | | | 702/75 |
| 2015/0133111 A1* | 5/2015 | Bevan | H04B 1/1027 |
| | | | 455/423 |
| 2016/0044630 A1* | 2/2016 | Markhovsky | H04W 64/006 |
| | | | 455/456.6 |
| 2016/0334502 A1* | 11/2016 | Ali | G01S 7/352 |
| 2016/0352444 A1* | 12/2016 | Chen | H04B 17/364 |
| 2017/0023670 A1* | 1/2017 | Jansen | G01S 7/354 |
| 2017/0227625 A1* | 8/2017 | Markhovsky | G01S 5/0215 |
| 2017/0230129 A1* | 8/2017 | Yoo | H04W 24/06 |
| 2017/0237484 A1* | 8/2017 | Heath | H04B 17/336 |
| | | | 398/26 |

OTHER PUBLICATIONS

Chu, "Polyphase Codes with Good Periodic Correlation Properties", "Transactions on Information Theory", Jul. 1972, pp. 531-532, Publisher: IEEE.

Strang, Gilbert, "Linear Algebra and its Applications", 1988, pp. ix, v-vii, 442-443, vol. 3rd Edition, Publisher: Thompson Learning, Inc., Published in: United States of America.

Beck et al., "Passive Intermodulation (PIM) Testing in Distributed Base Transceiver Station Architecture", "U.S. Appl. No. 15/430,211, filed Feb. 10, 2017", filed Feb. 10, 2017, pp. 1-35.

* cited by examiner

DETERMINING DISTANCE TO SOURCE OF PASSIVE INTERMODULATION PRODUCT (PIM) IN A DISTRIBUTED BASE STATION

BACKGROUND

The traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data output from the BBU to radio frequency signals for radiating from one or more antennas coupled to the RRH and to produce baseband data for the BBU from radio frequency signals that are received at the RRH via one or more antennas.

The RRH is typically installed near the BTS antennas, often at the top of a tower, and the BBU is typically installed in a more accessible location, often at the bottom of the tower. The BBU and the RRH are typically connected through one or more fiber optic links. The interface between the BBU and the RRH is defined by front-haul communication link standards such as the Common Public Radio Interface (CPRI) family of specifications, the Open Base Station Architecture Initiative (OBSAI) family of specifications, and the Open Radio Interface (ORI) family of specifications.

Wireless operators are under constant pressure to increase the speed, capacity and quality of their networks while continuing to hold the line on cost. As technologies evolve, the challenge is becoming increasingly difficult. One specific reason: the escalating occurrence and cost of passive intermodulation (PIM) products in the uplink band.

Already recognized as a significant drain on network performance and profitability, the problem of PIM products is intensifying. PIM products are caused by nonlinearities in mechanical components of a wireless system, e.g., antenna connectors, junctions of dissimilar materials. PIM sources can also be found in nearby metal objects such as guy wires, anchors, roof flashings, and pipes. Also, rust, corrosion, loose connections, dirt, and oxidation may be a source of PIM products. Advanced wireless equipment is becoming more sensitive, and new technologies like LTE are increasingly noise limited. It has been noted that a 1 Decibel drop in uplink sensitivity due to PIM products in the uplink band can reduce coverage by as much as 11 percent.

Testing for PIM products using conventional coaxial RF testing equipment is slow, costly and dangerous. Each sector, frequency and technology must be individually connected and tested. So, most operators resort to PIM testing only after detecting a significant rise in the noise floor or a drop in connection quality.

One aspect of PIM testing involves determining the distance to a source of the PIM product. Conventionally, the distance to the PIM source is determined using a reflectometry system. This solution uses analog front end electronic components like a mixer, and an oscillator which provide good measurement accuracy. But this conventional system is dangerous in a distributed base station architecture with a digital interface like CPRI/OBSAI/ORI as a tower climb is used to connect to the antenna ports of the RRH.

Other solutions avoid the dangerous tower climb by estimating a delay for the RRH transceiver chain including the front-haul (optical fiber) communication link between the RRH and the BBU. This estimation is difficult to obtain with no knowledge of the CPRI/OBSAI/ORI protocol interface which can vary from manufacturer to manufacturer. Further, such estimates are prone to error due to the presence of time jitter, buffering in RRH delay, and low accuracy timing measurement at the CPRI/OBSAI/ORI interface. Therefore, there is a need in the art for a technique for safely and accurately determining the distance from an antenna port of an RRH to a PIM source.

DRAWINGS

DETAILED DESCRIPTION

Figure 1:
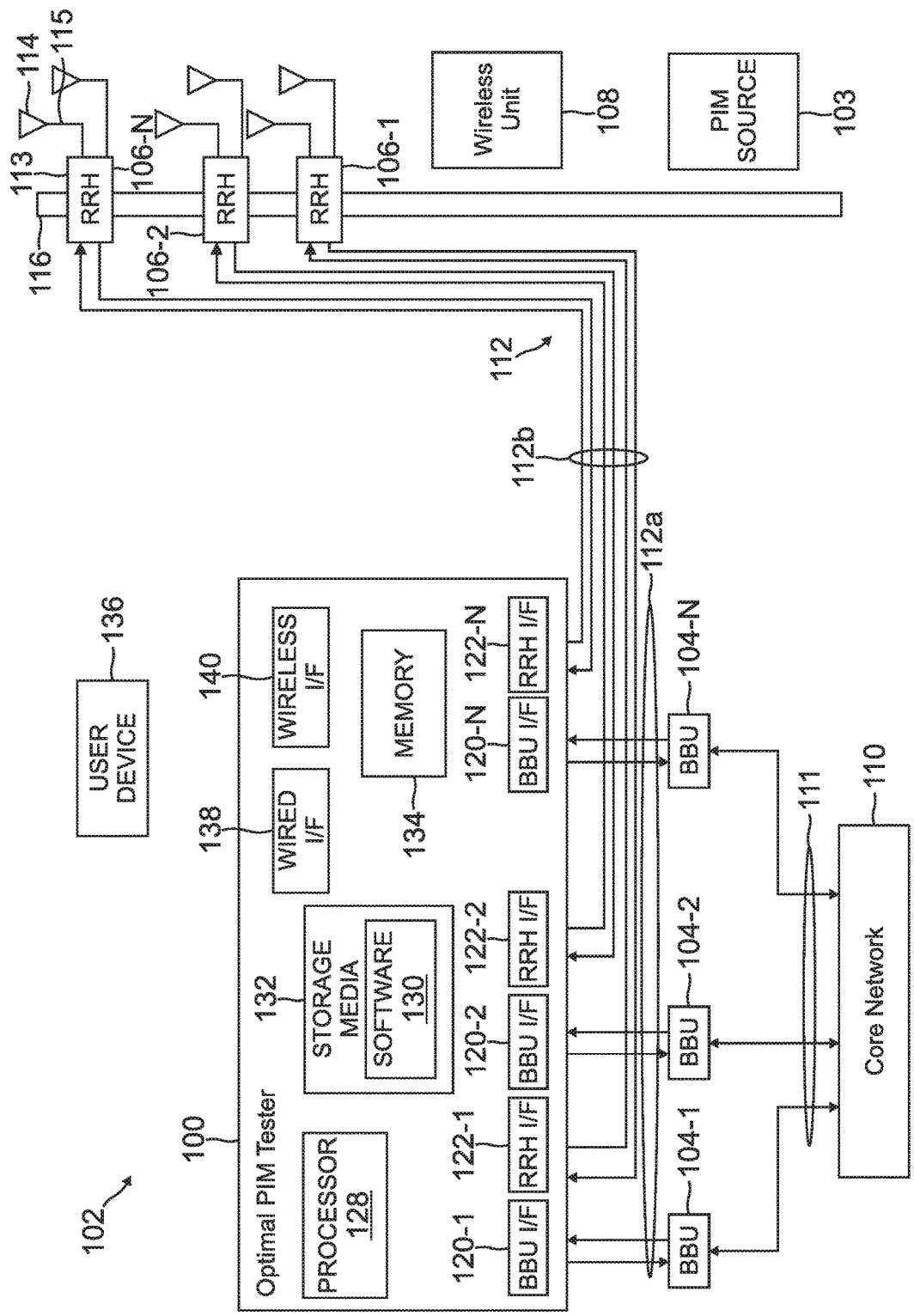
FIG. 1 is a block diagram of one exemplary embodiment of a tester for a distributed base station system within which the techniques for determining the distance to a PIM source described here can be used.

Embodiments of the present invention provide a technique to measure a distance from a remote radio head (RRH) to a source of a passive intermodulation (PIM) product. The distance to PIM consists in measuring the distance between the antenna connector and the source of the PIM product. Advantageously, embodiments of the present invention enable measurement of the distance to the PIM source over the front-haul communication link, e.g., a CPRI/OBSAI/ORI interface, between the RRH and a baseband unit (BBU). As a result, RF maintenance and troubleshooting does not require a technician to climb up a cell tower to connect the test equipment to the antenna port.

Embodiments of the present invention measure distance to a PIM source by transmitting a test signal or predefined pattern (e.g., a chirp) at the transmit antenna port and analyzing a reflecting signal, e.g., the PIM product. The interest of the chirp is its good correlation property, product property and low sensitivity to self-interference in the radio channel between reflections of the test signal (chirp).

The test equipment used to determine the distance to the PIM source is placed between the RRH and the BBU and is connected to the physical optical interface ports of the RRH and the BBU. The test equipment transmits the test signal on the front-haul communication link (e.g., CPRI, OBSAI, ORI) to be transmitted by the RRH. The RRH receives the reflected signal (PIM product) in the uplink band and passes the received signal to the BBU over the front-haul communication link. The capture of the reflected signal is done at the CPRI/OBSAI interface carrying I/Q samples received from the RRH module and transmitted to the BBU module.

The test equipment operates during site maintenance. It can transfer any type of I/Q samples to the antenna and receive any type of I/Q samples captured from the antenna. The test equipment can detect external or internal PIM sources. External PIM sources are issued from corroded objects, such as fences, metal roofs or tower rusty bolts in sight from the antenna. Internal PIM sources are issued from imperfect RF feed line and connectors (e.g., metal chips floating inside connectors).

This disclosure provides multiple solutions to the problem of determining the distance to the PIM source using the transmitted test signal that is launched from the test equipment inserted between the BBU and the RRH. In one embodiment, an Eigen component of the reflected test signal is analyzed to determine the distance to the PIM source. In an alternative embodiment, a cross correlation of the reflected signal with its corresponding transmitted test signal (reference pattern) is analyzed to produce the distance measurement. In this embodiment, the test signal or reference pattern is a chirp signal, a PN sequence, a Zadoff-Chu sequence or any other appropriate sequence that shows good correlation properties. In another embodiment, the distance to the PIM source is determined using an enhanced version of reflectometry for PIM source default.

Advantageously, the solutions described herein do not require knowledge of the proprietary operation and maintenance messages at the digital interface to the front-haul communication link to obtain various delay of transceiver loop (RRH, fiber, antenna cable). Further, the embodiments described herein enable determination of the distance to a single PIM source with a good accuracy. Embodiments of the present invention also extract information on the distance to more than one PIM source if there is sufficient separation between the PIM sources.

Distributed Base Station

FIG. 1 is a block diagram of one exemplary embodiment of a tester 100 for a distributed base station system, indicated generally at 102. In the exemplary embodiment shown in FIG. 1, the system 102 comprises a plurality of baseband units (BBU) 104-1 to 104-N and a plurality of remote radio heads (RRH) 106-1 to 106-N that communicate over a plurality of wireless radio frequency (RF) channels with one or more wireless units 108 (such as mobile telephones, smartphones, tablets, wireless modems for laptops or other computers or for other devices such as wireless sensors or other "Internet of Things" (IOT) or machine-to-machine (M2M) devices) using one or more standard wireless air interfaces. The exemplary embodiment of system 102 shown in FIG. 1 may support several air interfaces, e.g., three air interfaces including, but not limited to, Long-Term Evolution (LTE) 4G air interface described in the "Third Generation Partnership Project (3GPP) Technical Specification (TS) 36.211 Evolved Universal Terrestrial Radio Access (E-UTRA); Physical Channels and Modulation" specification produced by the 3GPP, Advanced Wireless Services (AWS-1), Personal Communications Services (PCS), CLR, GSM, WiMax, and others. It is to be understood that other air interfaces can be used.

Each BBU 104 is communicatively coupled to the core network 110 of a wireless service provider using a suitable bi-directional backhaul communication link 111 and interface (for example, using a wireless or wired ETHERNET connection and using the LTE S1 interface). The backhaul communication link 111 can also be used for base station-to-base station communications using the LTE X2 interface.

Each BBU 104 is communicatively coupled to a corresponding RRH 106 using a bi-directional front-haul communication link 112. In the exemplary embodiment shown in FIG. 1, the bi-directional front-haul communication link 112 is implemented using a plurality of pairs of optical fibers, where, in each pair, one optical fiber is used for downlink communications from the BBU 104 to the RRH 106 and the other optical fiber is used for uplink communications from the RRH 106 to the BBU 104. Further, as shown in FIG. 1, the bi-directional communication link 112 are split into two parts to allow a tester 100 (described in more detail below) to be inserted between the BBUs 104 and the RRHs 106. Namely, the bi-directional communication link 112 include a first part 112a connecting BBU 104 to tester 100 and a second part 112b connecting tester 100 to a respective RRH 106. It is to be understood that the front-haul communication link 112 can be implemented in other ways. The exemplary embodiment shown in FIG. 1 is described here as using a CPRI interface for communications between each BBU 104 and the corresponding RRH 106 over the front-haul communication link 112. It is to be understood, however, that a different front-haul interface could be used (for example, the OBSAI or ORI interface).

As noted above, each BBU 104 performs baseband processing for the particular air interface that is being used to wirelessly communicate over its assigned RF channel, and the RRH 106 performs radio frequency processing to convert baseband data output from the BBU 104 to radio frequency signals for radiating from one or more antennas 114 that are connected to the RRH 106 at antenna port 113 via coaxial cable 115 and to produce baseband data for the associated BBU 104 from radio frequency signals that are received at the RRH 106 via one or more antennas 114. Advantageously, tester 100 enables determination of the distance between antenna port 113 of RRH 106 and PIM source 103. Although PIM source 103 is illustrated as being external to system 102, as noted above, PIM source 103 may be internal to the system 102, e.g., in antenna connector 113.

During normal operation of the system 102, in the downlink direction, the BBUs 104 generate downlink baseband IQ data to encode frames of downlink user and control information received from the core network for communication to the wireless units 108 over the appropriate wireless RF channels. The downlink baseband IQ data is communicated from the BBUs 104 to the RRHs 106 over the respective front-haul communication link 112. The RRHs 106 receive the downlink baseband IQ data and generate one or more downlink analog radio frequency signals that are radiated from the one or more antennas 114 for reception by the wireless units 108. The wireless units 108 perform baseband processing, in accordance with the air interface, on the received downlink analog RF downlink signals in order to recover the frames of downlink user and control information.

During normal operation of the system 102, in the uplink direction, the wireless units 108 generate, in accordance with the air interface, uplink analog radio frequency signals that encode uplink user and control information that is to be communicated to the core network 110 and transmits the generated uplink analog RF signals over the wireless RF channel. The uplink analog RF signals are received by one or more antennas 114 connected to the RRHs 106. The RRH 106 that receives the uplink analog RF signal produces uplink baseband IQ data from the received uplink analog RF signals. The uplink baseband IQ data is communicated from the RRH 106 to the associated BBU 104 over the front-haul communication link 112. The BBU 104 receives the uplink baseband IQ data and performs baseband processing, in accordance with the air interface, on the uplink baseband IQ data in order to recover the uplink user and control information transmitted from the wireless units 108. The BBU 104 communicates the recovered uplink user and control information to the core network 110 over the backhaul communication link 111 using the backhaul interface.

The RRHs 106 are typically installed remotely from its corresponding BBU 104, near the antennas 114 and is mounted to a structure 116 (such as a tower, pole, building, tree, or other structure). For example, the RRH 104 can be mounted near the top of the structure 116 and the BBU 104 can be located on the ground, where the optical fibers used to implement the front-haul communication link 112 run up the structure 116 to couple the BBU 104 to the RRU 106. Although FIG. 1 shows the RRH 106 mounted near the top of structure 116, the RRH 106 can be mounted at other positions relative to the structure 116, for example, approximately midway between the bottom and top of the structure 116.

During normal operation, signals transmitted from RRH 106 may interact with PIM source 103 and produce PIM products. PIM products 103 are received by RRH 106 and can interfere with the normal operation of system 102. As such, during maintenance operations, tester 100 is used to determine the distance from the RRH 106 to help identify the PIM sources so that corrective action can be taken.

Tester

As shown in FIG. 1, tester 100 can be coupled into the font-haul communication link 112 between the BBUs 104 and the RRHs 106. In this manner, tester 100 is enabled to insert test signals in the downlink frames of baseband IQ data transmitted to the RRH. Also, tester 100 is enabled to receive signals in the uplink frames of baseband IQ data communicated from the RRHs 106. This capturing of baseband data enables tester 100 to determine the distance from an antenna port 113 to a PIM source 103 using the techniques described in more detail below.

A user can interact with the software 130 executing on the tester 100 using a user device 136, e.g., smartphone, tablet, or computer. The user device 136 is communicatively coupled to the tester 100. In the exemplary embodiment shown in FIG. 1, the tester 100 includes one or more wired interfaces 138 (for example, an ETHERNET interface and/or a USB interface) and wireless interfaces 140 (for example, a Wi-Fi wireless interface) to communicatively couple the tester 100 to a local area network or directly to the user device 136. Moreover, a remotely located user device 136 can access the tester 100 via a connection established over the local area network and/or a public network such as the Internet. In one embodiment, the software 130 implements a webserver that is operable to present a browser-based user interface that enables a user to use a general-purpose Internet browser installed on the user device 136 to interact with the software 130 on the tester 100.

Also, although the embodiments described above are described as using antenna carriers in downlink CPRI frames, it is to be understood that the techniques described here can be used with other streams of baseband IQ data (for example, streams of baseband IQ data communicated over an OBSAI or ORI interface).

Common Functionality

Figure 2:
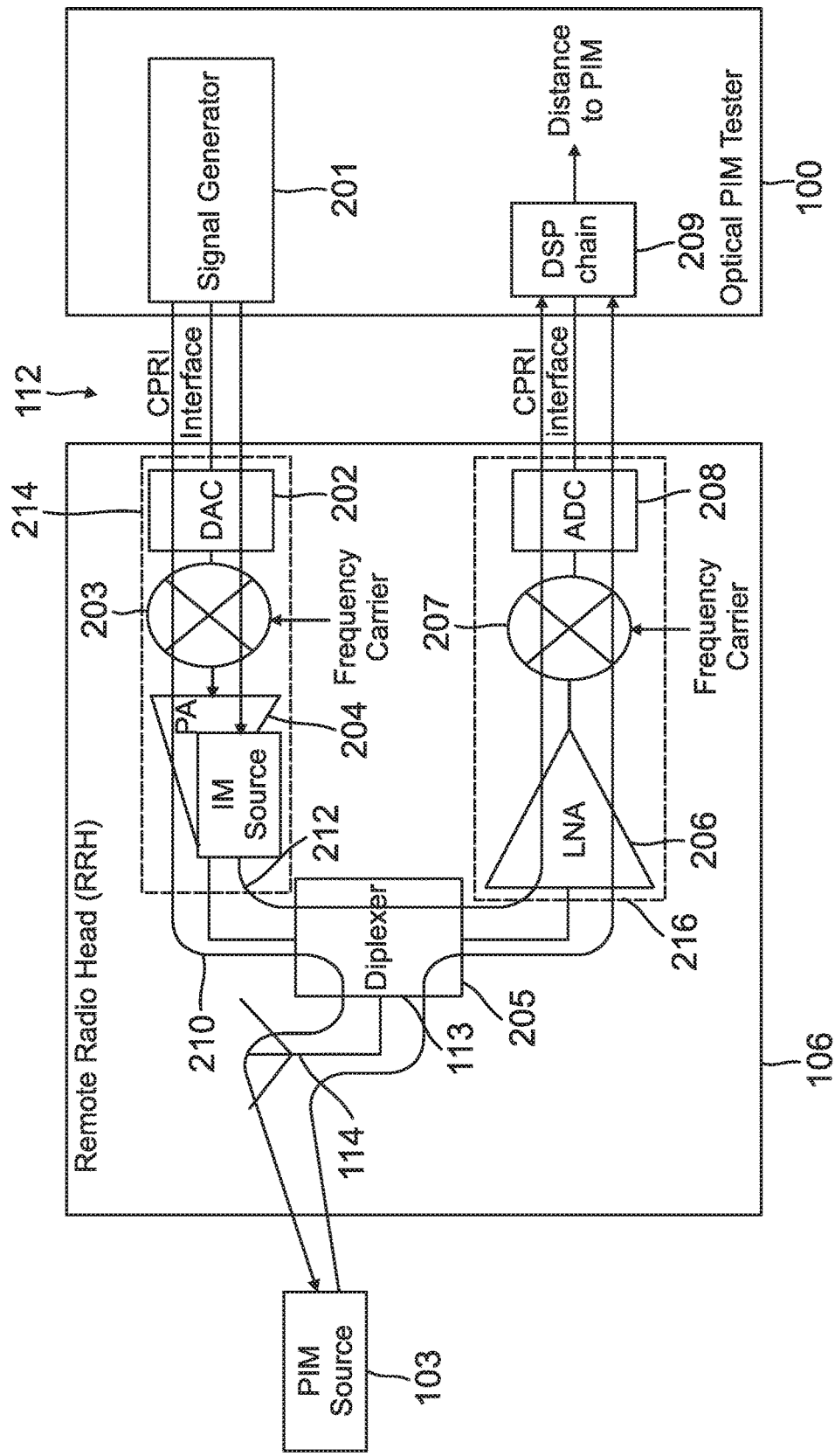
FIG. 2 is block diagram of an embodiment of a tester coupled to a remote radio head that illustrates a general approach to determining a distance to a PIM source.

FIG. 2 is a block diagram that illustrates a general approach to determining the distance to a PIM source 103 from an antenna connector 113 of remote radio head 106 according to the various embodiments of the present invention. Under this approach, signal generator 201 in tester 100 generates a test signal in appropriate IQ containers of the front-haul communication link (CPRI/OBSAI/ORI interface) 112. In one embodiment, the test signal includes a chirp signal (discussed in more detail below) and a continuous wave (CW) signal. The chirp signal and the continuous wave signal are transmitted as baseband data over the front-haul communication link 112 to RRH 106.

RRH 106 includes downlink components 214 and uplink components 216 that are each coupled to diplexer 205. Downlink components 214 include the series connection of digital to analog converter (DAC) 202, mixer 203 and power amplifier (PA) 204. Power amplifier 204 is coupled to diplexer 205. Antenna 114 is coupled to antenna port 113 at diplexer 205. Diplexer 205 is also coupled to the uplink components 216. The uplink components 216 include the series connection of low noise amplifier (LNA) 206, mixer 207, and analog to digital converter (ADC) 208. ADC 208 is coupled to a digital signal processing (DSP) chain 209 in tester 100 via front-haul communication link 112 (e.g., CPRI/OBSAI/ORI connection).

In operation, tester 100 determines the distance to a PIM source 103. To do this, tester 100 launches the test signal toward the RRH 106 on the front-haul communication link 112. These test signals, and their reflections, traverse two different paths before arriving back at the tester 100. The test signals and reflections on these two paths enable determination of the distance to PIM source 103. On a first path 210, the test signal travels to the PIM source 103 and produces a PIM product that is reflected and returns to the tester 100. On a second path 212, the test signal produces an intermodulation (IM) product that is reflected back to the tester 100 within the RRH 106.

The manner in which the distance to the PIM source 103 is determined depends on the sampling rate used in RRH 106. In one embodiment, a low sampling rate is used in the RRH 106. In other embodiments, a high sampling rate is used in the RRH 106.

In the case of the low sampling rate, a three-step process is used to determine the distance to the PIM source 103. First, a test signal is launched to determine a coarse timing estimation of the chirp arrival. The purpose of the coarse timing is described in more detail below. Second, further test signals are launched to generate an estimation of the PIM relative timing. At this second step, the signal level for the test signal is set so that no saturation occurs in RRH 106 (neither in PA 204 nor in DAC 202) such that only the PIM reflection will be reflected back to the RRH 106 and the delay of the PIM reflection can be estimated with a dedicated algorithm. Finally, additional test signals are launched that saturate circuitry in the RRH 106 (e.g., either PA 204 or DAC 202). These test signals are used to detect the relative timing of the IM reflection signal (reference timing). At this stage both IM and PIM reflections arrive at the RRH 106 and optical PIM tester 100. An algorithm is employed in the DSP chain 209 of optical PIM tester 100, like a "canceler" or "DC blocker," to eliminate the PIM reflection during IM reflection extraction. Once the PIM reflection is eliminated, the IM relative timing can be estimated with the dedicated algorithm. Finally the difference between both IM and PIM relative timing is used in the distance to PIM calculation.

In the case of a high sampling rate in the RRH 106, a two-step process is used to determine the distance to the PIM source 103. First, a test signal is launched to determine a coarse timing estimation of the chirp arrival. Secondly, further test signals are launched to generate a fine estimation of the PIM and IM relative timing using dedicated a pseudo spectrum analysis algorithm.

Returning to the low sampling rate embodiment, in the first step, the transmitted chirp sequence is repeated such that the tester can use the multiple sequences for signal to noise ratio improvement. The coarse timing determination is implemented with a classical correlator with an expected transmitted sequence. To have a better chance to find the coarse timing, the PA 204 of RRH 106 is driven to saturation. The accuracy of the coarse timing is expected at worse to be around +/−1 sampling timing (e.g. 1/7.56 MHz). Once the coarse timing of the repeated chirp is identified, the second and third steps can proceed.

In the second and third steps, the duration of the chirp sequence (Tchirp) and the repeating interval is known. The coarse timing of the received chirp is known thanks to the first step (coarse timing estimation). As a result, at this stage it is possible to sum at least two Tchirp sample bunches to improve signal to noise ratio (because those chirp sequences are repeated on a regular basis). The number of samples collected within a duration of Tchirp is N=Tchirp*fs where fs is the receiver sampling rate.

Further, in the second and third steps, test signals (a number of chirp signals) are transmitted sequentially on first path 210 and second path 212 to enable comparison of the timing on the respective paths. Advantageously, the difference between the first path 210 and the second path 212 corresponds to the distance between the antenna port 113 of RRH 106 and PIM source 103.

Figure 3:
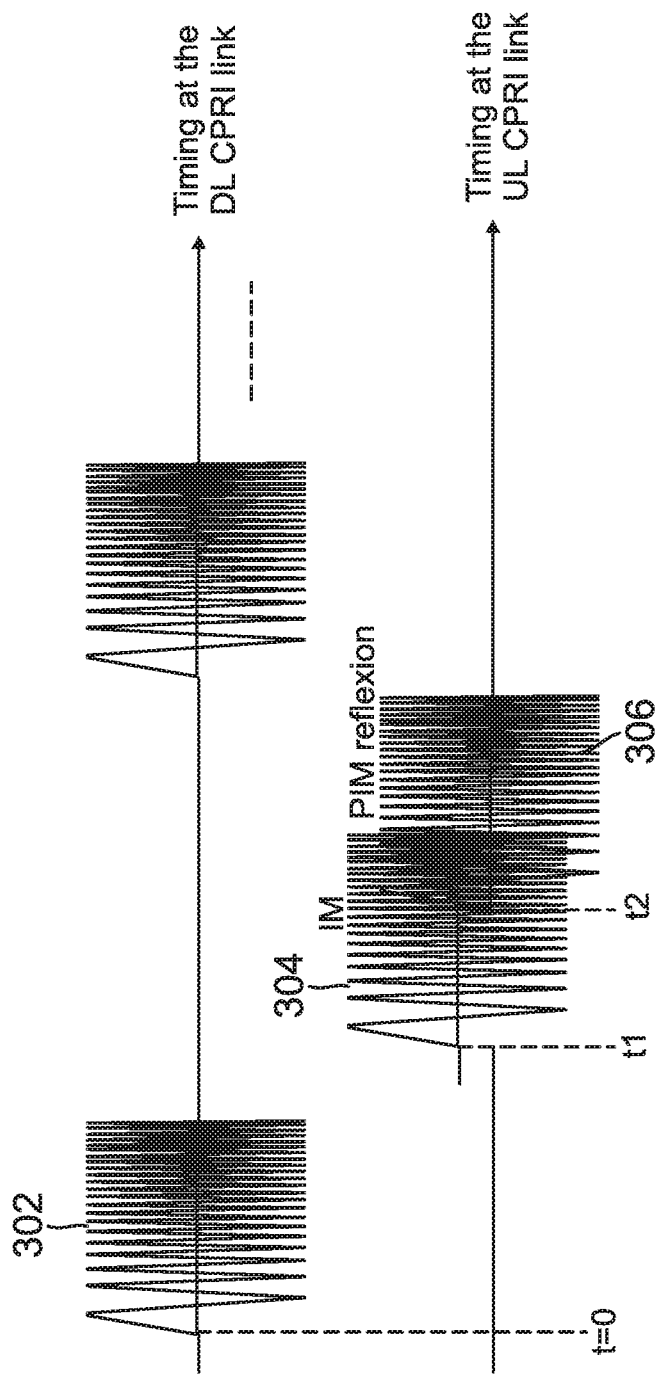
FIG. 3 is a timing diagram illustrating the relative timing of signals transmitted in the tester of FIG. 2.

This is shown graphically in FIG. 3. The test signal, e.g., chirp 302, is transmitted from tester 100 at time t=0. At time t1, the IM signal 304 generated on path 212 is received at tester 100. Finally, at time t2, the PIM product 306 produced by the test signal 302 traversing first path 210 is received at tester 100. The time difference of arrival (t2−t1) is the time it takes for the test signal 302 to travel to the PIM source 103 from the antenna port 113 and for the reflection (PIM product) 306 to return to the antenna port 113. The distance to the PIM source from the RRH 106 is calculated as follows:

$$D = v \times \frac{(t2 - t1)}{2} \quad (1)$$

where v wave speed of the media between the antenna port 113 of RRH 106 and PIM source 103. If the media is composed from different materials, the formula is a composite formula taking into account the length of different materials and associated propagation speed.

Returning to FIG. 2, signal generator 201 launches a test signal, e.g., the chirp and CW signals, in the front-haul communication link 112 toward DAC 202. DAC 202 converts the received test signal to an analog signal. The analog signal is mixed with a carrier frequency at mixer 203 and amplified at power amplifier 204. The amplified analog signal is then passed to the antenna 114 by diplexer 205. In the presence of a non-linearity (PIM source 103) a PIM product is reflected back to RRH 106 and received at antenna 114. The reflected signal (PIM product) is passed by the diplexer to the uplink components 216 where it is amplified (LNA 206), down converted (mixer 207) and converted to a digital signal (ADC 208). The digital signal is passed over front-haul communication link 112 to DSP chain 209 of tester 100 (reflection 306 received at time t2 in FIG. 3) for processing to determine the distance to the PIM source 103.

As discussed above, a third test (third step) or reference signal is used in determining the distance to the PIM source 103. This third test signal is also generated by signal generator 201 and launched onto the front-haul communication link 112 (CPRI/OBSAI interface). This third test signal is designed to generate intermodulation within the RRH 106. The third test signal can be a chirp with amplitude that saturates power amplifier 204 or DAC 202. A nonlinear signal can also be convenient to generate IM in the transceiver if it is not smoothed by a digital frontend filter of RRH 106. As a result of intermodulation between tones, the PA 204 generates an IM signal that is also composed of a chirp waveform at frequency falling in the uplink band of the RRH 106. This last signal crosses the diplexer 205 to the LNA 206. The chirp wave can therefore be analyzed by the DSP chain 209 to capture a reference timing (e.g., time t1 in FIG. 3). This IM reference timing is used to compute the PIM source distance as discussed above.

The foregoing description provides the general framework for determining the distance from the RRH 106 to the PIM source 103. As discussed with respect to FIG. 2, DSP chain 209 processes the reflected signals to determine this distance based on the reflected signals. Various exemplary embodiments are described below for this DSP chain 209 that can be used to extract out the distance to the PIM source.

Distance Determination Using Frequency Estimation

Figure 4:
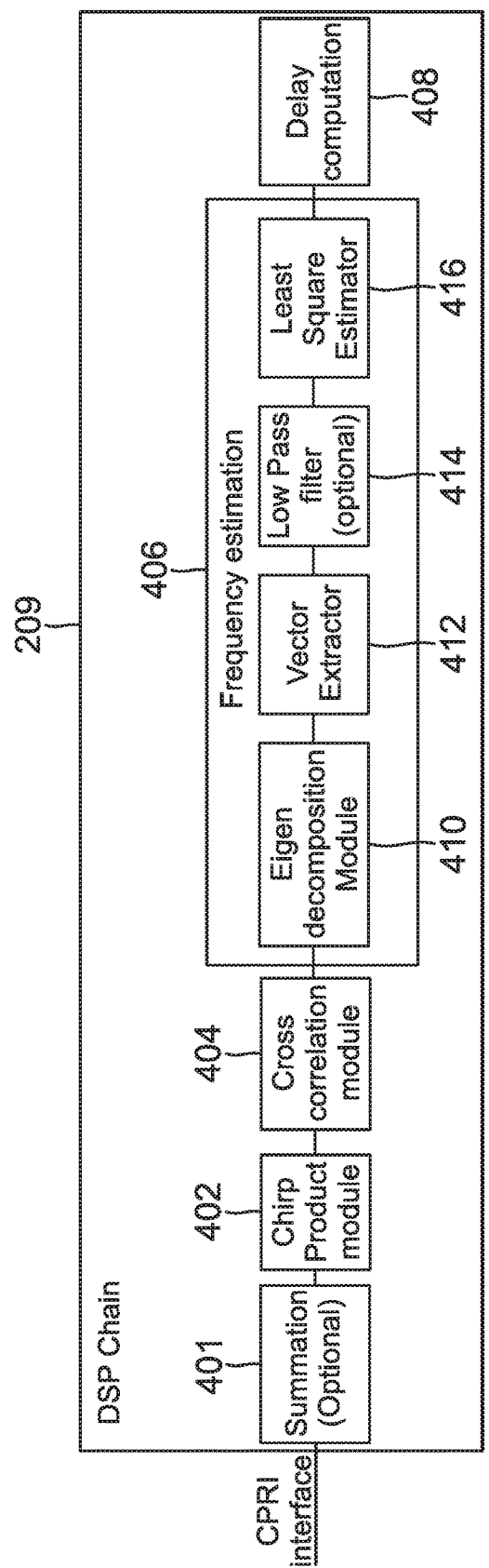
FIG. 4 is a block diagram of one embodiment of a DSP chain in a tester of FIG. 2.

FIG. 4 is a block diagram of one embodiment of a DSP chain 209 for determining the distance to a PIM source 103. In this embodiment, the distance is determined using a frequency estimation. At a high level, this embodiment converts the received reflections to a sinewave with a frequency that is proportional to the delay of the reflected signal. The difference between the time delays of these two signals is the same as t2−t1 in FIG. 3 above, and can thus be used to determine the distance to the PIM source according to equation (1) above.

As discussed above with respect to FIG. 2, signal generator 201 generates a test signal to be used to determine the distance to the PIM source. This test signal, in one embodiment, includes a chirp signal and a continuous wave (CW) signal. The expression of the transmitted chirp signal is:

$$\text{chirp}(n) = Ae^{\{j2\pi(f_t n + \frac{1}{2}mn^2)\}} \quad (2)$$

The expression of the transmitted CW signal is:

$$CW(n) = e^{j2\pi f_{cw} n} \quad (3)$$

It is noted that $f_{CW}$, $f_r$, $f_t$ are normalized frequencies. They are normalized with the frequency sampling "fs". In one embodiment, both chirp signal and CW signal are transmitted at the same time to produce intermodulation at the PIM source 103 and the IM signal at the analog nonlinearity (e.g., PA 204).

At the DSP chain 209, the received chirp signal is:

$$s(n) = Ae^{\{j2\pi(f_r n + \frac{1}{2}mn^2)\}} + w(n) \quad (4)$$

In equation (4), s(n) represents the received noisy chirp with the following parameters:
m: the chirp frequency change rate
$f_r$: the chirp initial frequency
n: the discrete time index
A: constant complex component representing the chirp amplitude and phase rotation due to PIM/IM reflection.
w(n): the received noise In the DSP chain 209, the reflection (noisy chirp, s(n)) is received at chirp product module 402. The chirp product module 402 converts the chirp signal into a sinewave by multiplying the reflection (noisy chirp) with the conjugate of a reference chirp expression. The chirp product formulation is as follows:

$$s(n) \times \mathrm{chirp}^*(n) = \left(Ae^{\{j2\pi(f_r(n-\tau)+\frac{1}{2}m(n-\tau)^2)\}} + w(n)\right) * e^{\{-j2\pi(f_r n+\frac{1}{2}mn^2)\}} \quad (5)$$

The exact position in time of the received chirp is not known. Thus, the product will apply with an unknown time delay 'τ'. This uncertainty is modeled by including the parameter τ in equation (5). After some simplification, the formula after chirp product can be written as:

$$s(n) \times \mathrm{chirp}^*(n) = Ae^{\{j2\pi(-m\tau n+\frac{1}{2}m\tau^2-f_r\tau)\}} + w'(n) \quad (6)$$

Equation (6) represents a sinusoidal signal with frequency proportional to the time delay uncertainty.

In the context of distance to PIM measurement, the ADC 208 captures two chirps with two different time uncertainties: τ1 and τ2 (a first chirp from IM reflection and a second from PIM reflection). After chirp product module 402, the signal is as provided in equation (7):

$$x(n) = s(n) \times \mathrm{chirp}^*(n) = \quad (7)$$
$$A_{IM} e^{\{j2\pi(-m\tau_1 n+\frac{1}{2}m\tau_1^2-f_r\tau_1)\}} + A_{PIM} e^{\{j2\pi(-m\tau_2 n+\frac{1}{2}m\tau_2^2-f_r\tau_2)\}} + w''(n)$$

This signal is composed of two sinewaves whose frequencies are proportional to the time delay uncertainty. Note that the phase rotation at the PIM/IM source (phase of complex component $A_{IM}$ and $A_{PIM}$) has no influence on the resulting frequency values mτ2 and mτ1. The round trip time duration (antenna port 113 to PIM source 103 to antenna port 113) can be expressed as: τ2−τ1. As a result the estimation of the round trip time duration consists in estimating the frequencies of the noisy composite sinewave signal and then extracting the distance to the PIM source 103 based on the estimated frequencies.

The embodiment of FIG. 4 includes an optional summation component 401 that can be used to improve the signal-to-noise ratio. When the summation component 401 is included, it is possible to sum at least two Tchirp sample bunches to improve signal to noise ratio (because those chirp sequence are repeated on a regular basis). For the sake of processing load, summation component 401 precedes the chirp product module 402 in FIG. 4. The number of samples collected within a duration of Tchirp is N=Tchirp*fs where fs is the receiver sampling rate.

To further improve signal-to-noise ratio a cross correlation applies on the composite sinewave signal by cross correlation module 404. Two vectors of signal are extracted at two different time instants sufficiently spaced such that noise is assumed uncorrelated. The subsequent signal vectors are x1(n)=x(n) and x2(n)=x(n+D). The cross correlation expression is as follows:

$$r_{x_1 x_2}(k) = E[x_1^*(n) x_2(n+k)] = A_{IM}^2 e^{\{-j2\pi(m\tau_1(k+D))\}} + A_{PIM}^2 e^{\{-j2\pi(m\tau_2(k+D))\}} + w'''(k) \quad (8)$$

Parameter 'D' is a constant parameter. w'''(k) is the noise component whose value is equal zero thanks to expectation operation. In the implementation, the noise component will not equal zero as the expectation operation will not apply on an infinite sample. Thus, to eliminate the residual noise, Eigen decomposition is applied to the correlation matrix. Note that the cross correlation formula represents the summation of two sinusoids whose frequency are proportional to the respective τ1 and τ2 delays.

$R_{x_1 x_2}$ represents all cross correlations for different time lag k. Column vector and row vector of the correlation matrix contains the noisy sinewaves whose frequencies needs to be determined. $R_{x_1 x_2}$ is structured as a Toeplitz matrix:

$$R_{x_1 x_2} = \begin{bmatrix} r_{x_1 x_2}(0) & r_{x_1 x_2}(-1) & \cdots & r_{x_1 x_2}(-p+1) \\ r_{x_1 x_2}(1) & r_{x_1 x_2}(0) & \cdots & r_{x_1 x_2}(-p+2) \\ \vdots & \vdots & \vdots & \vdots \\ r_{x_1 x_2}(p-1) & r_{x_1 x_2}(p-2) & \cdots & r_{x_1 x_2}(0) \end{bmatrix} \quad (9)$$

The Rx1x2 is not necessarily symmetric. The next step consists in extracting precise values of the tones.

The process for determining distance to a PIM source using frequency estimation differs based on the sampling rate used by the distributed base station under test. Those I/Q samples can be different due to the LTE bandwidth used at the air interface. There are 4 sampling rates in LTE (7.68 MHz, 15.36 MHz, 23.04 MHz, 30.72 MHz). In one embodiment, the tester 100 is able to estimate the distance to the PIM source 103 at +/−2 meters. As a result of the speed of light, this is corresponding to 1/2.25*Ts of possible induced delay accuracy requirement (Ts is the sampling period with 30.72 MHz sampling frequency). It is difficult to obtain this accuracy with a sampling at I/Q CPRI interface of 7.68 MHz, 15.36 MHz, and 23.04 MHz. As a result two different algorithms are proposed for the different CPRI interface sampling configuration: configuration with low sampling rate (7.68 MHz, 15.36 MHz and 23.04 MHz) and one configuration with high sampling rate (30.72 MHz).

Frequency Estimation with Low Sampling Rate

If the I/Q sampling period is 7.68 MHz, 15.36 MHz or 23.04 MHz (sampling period greater than delay estimation accuracy requirement) and if the PIM and IM source are closely located, the delay estimation process is performed in three steps. These are the same three steps as discussed above with respect to FIG. 2.

Step 1

Step 1 is described above and is used to extract the coarse timing estimate.

Step 2

The block diagram of FIG. 4 includes frequency estimator 406 that is part of the signal processing chain 209 and is dedicated to the extraction of the frequency tones from each intermodulation reflection.

Step 2 consists in examining only one PIM reflection (no PA saturation forced at the RRH 106). First assume only one PIM source or a grouped of PIM sources located close to each other. The instant the chirp product applies on the received signal is arbitrary. Nevertheless, if the product timing applies aligned with the received chirp reflection, a DC component will result making impossible the Eigen decomposition. Therefore, to avoid DC component as a result of the chirp product, a rough chirp timing estimation is performed in step 1.

Eigen decomposition (Singular Value Decomposition can also be used) is applied on the cross correlation matrix at Eigen decomposition module 410 to separate the noisy signal into a noise subspace and a signal subspace. The signal subspace is the sinusoidal or group of close sinusoidal information. And the noise subspace contains information on the noise w''''(k).

$$R_{x_1 x_2} = V \Sigma V^{-1} \quad (10)$$

V is Eigen vector matrix. Σ is the diagonal matrix of Eigen values. The first Eigen vector is extracted by vector extractor 412 and corresponds to the signal subspace and the last Eigen vectors are the noise subspace. The Eigen vector does not need to be orthogonal between each other to proceed with frequency estimation. The Eigen value can be positive, negative or complex.

For high signal-to-noise ratio (SNR), the computed first eigenvector is a pure sinewave. For low SNR, the extracted eigenvector is further cleaned from high frequency noise. An optional low pass filter 414 is used in that case. As discussed above, the sinewave frequency is proportional to the delay. A linear least square method is implemented by least square estimator 416 to extract frequency as described below. The signal Eigen vector comprises the complex signal of a sinewave. To obtain the frequency the trigonometric problem is converted into a linear problem. The sinewave trigonometric function is:

$$v = A \times \cos(wt + \phi) \quad (11)$$

where 'v' is the signal Eigen vector, 't' is a time vector, 'w' is the angular frequency and 'φ' is the initial phase of the resulting sinewave.

The linearization of the sinewave trigonometric function is given in the equation (11). The angular frequency 'w' can be found as follows:

$$\begin{bmatrix} w \\ \phi \end{bmatrix} = \begin{bmatrix} t_0 & 1 \\ \vdots & \vdots \\ t_N & 1 \end{bmatrix}^{-1} \times \text{angle}(v) \quad (12)$$

Note that the inverse matrix $$\begin{bmatrix} t_0 & 1 \\ \vdots & \vdots \\ t_N & 1 \end{bmatrix}^{-1}$$

can be predetermined. As a result, no matrix inversion is needed in the implementation in that case.

To improve reliability of the delay some statistic on the estimated frequency may be done. Step 2 can be repeated several times and the corresponding result can be analyzed using the histogram of the measured frequencies. The histogram is centered to the true frequency. A weighted mean is then applied to find the estimation of the true frequency. The PIM relative delay is then obtained.

Step 3

Once the estimation of the PIM relative delay is found, the third step can take place. The third step consists in sending the same pair of signals (CW and Chirp) with power increased to saturate the PA 204. The PIM signal may be stronger than the IM resulting in blinding the IM frequency estimation. To avoid this, the timing chirp product may be adjusted to mitigate the PIM effect over the measured IM. To do so the timing chirp can be set aligned to the instant corresponding to the PIM time arrival instant (as previously computed in step 2). The resulting signal after chirp product will be a DC component that can be removed with a DC blocker (notch filter at 0 Hz) or DC subtractor (the estimation of the DC is done from samples captured in step 2). Once the chirp product timing adjusted and the DC component removed, the IM reflection delay estimation described in FIG. 4 can proceed. Step 3 outcome is the IM chirp timing.

Alternative Step 3

Figure 5:
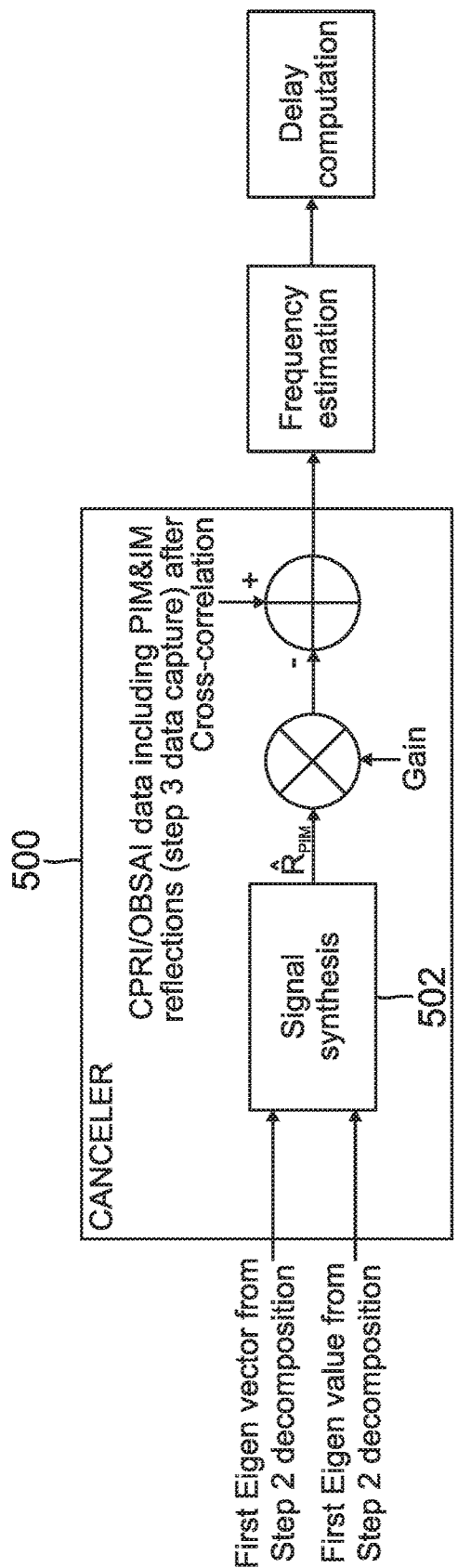
FIG. 5 is an alternate embodiment of a portion of the DSP chain in the tester of FIG. 2.
Figure 6:
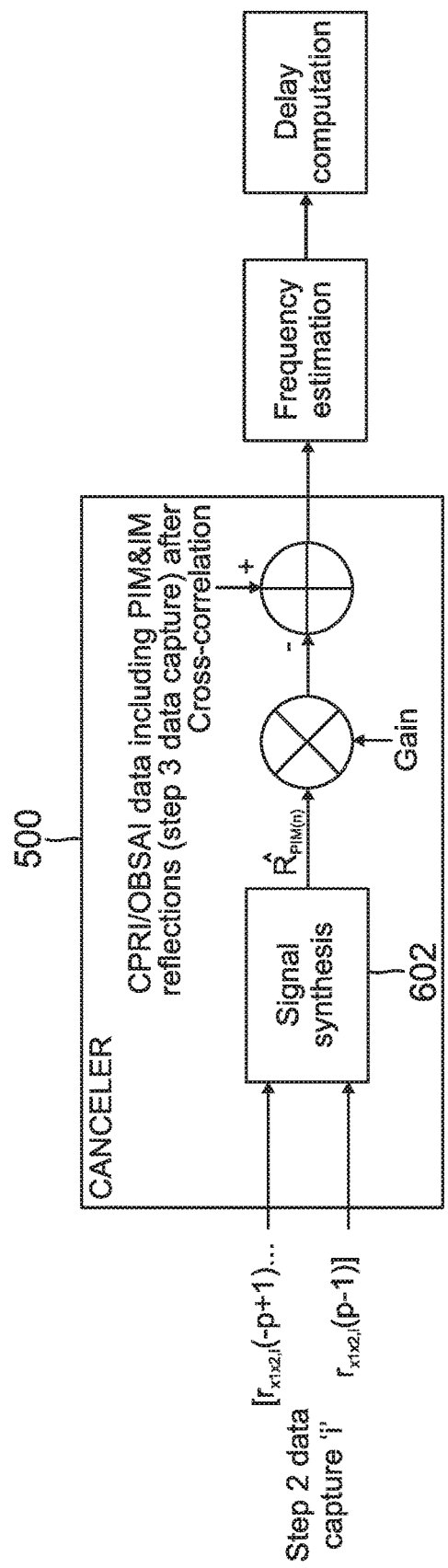
FIG. 6 is another alternate embodiment of a portion of the DSP chain in the tester of FIG. 2.

An alternative of the above step 3 algorithm (adjust timing and DC blocker) is described hereafter. The DC blocker can be replaced with a canceler as shown in FIG. 5. After DAC/PA saturation, the first eigenvector is composed of two sinewaves resulting from both PIM and IM reflections. The PIM reflection timing is known perfectly, therefore it is possible to eliminate its contribution from the received data. A canceller 500 can be employed for this purpose.

Canceler 500 includes a signal synthesizer 502 that synthetizes an estimation of PIM correlation samples from Eigen component found during step 2. The synthesized formula is:

$$\hat{R}_{PIM} = V_1 \times \sigma_1 \times V_1^{-1} \quad (13)$$

Where:
$V_1$: is the first eigenvector from step 1.
$\sigma_1$: is the first eigenvalue from step 1.
$\hat{R}_{PIM}$: is the cross correlation matrix estimation carrying PIM signal subspace information only.

A gain is applied on the synthesized signal decomposition to equalize with the step 3 power increased (power increase to saturate the PA/DAC). The estimated cross-correlation PIM matrix is subtracted from step 3 data capture such that only IM and noise signal remain. Then, the eigenvector decomposition can apply to estimate the frequency and IM reflection delay.

Second Alternative to Step 3

Another alternative of the above step 3 algorithm is described hereafter. In this embodiment, the signal synthesis block of canceler 500 is replaced with a sample mean estimator (SME) 602 as a way to eliminate the 0 mean centered noise signal and to keep only the PIM information. Step 3 runs without timing adjustment matching the PIM delay but step 3 runs with saturation in the RRH (e.g., PA 204 or DAC 202). The cross correlation vector estimated from step 2 is:

$$\hat{R}_{PIM}(k) = \frac{1}{N} \sum_{i}^{N} r_{x1x2,i}(k)$$

Where:
$r_{x1x2,i}$: is the cross correlation vector from step 2 data capture 'i'.
N: is the number of captures performed from step 2 algorithm
$\hat{R}_{PIM}(k)$: is the estimation of the PIM cross correlation signal at lag k cleaned from noise component.

Alternative Embodiment to Eigen Decomposition for Low Sampling Rate

The Eigen decomposition technique described above is an effective solution but comes with significant processing cost. The processing complexity depends on the matrix structure and is rated as a $O(n^3)$ or $O(n^2 \log(n))$ algorithm. For embedded solution and large matrix decomposition, the Eigen decomposition algorithm may be replaced by another method to separate noise from the user signal data. A simple method already described above is the Sample Mean Estimation algorithm. Compared to Eigen decomposition this method requires a significant number of received signal occurrences such that the SME algorithm mitigates noise by summation.

Figure 7:
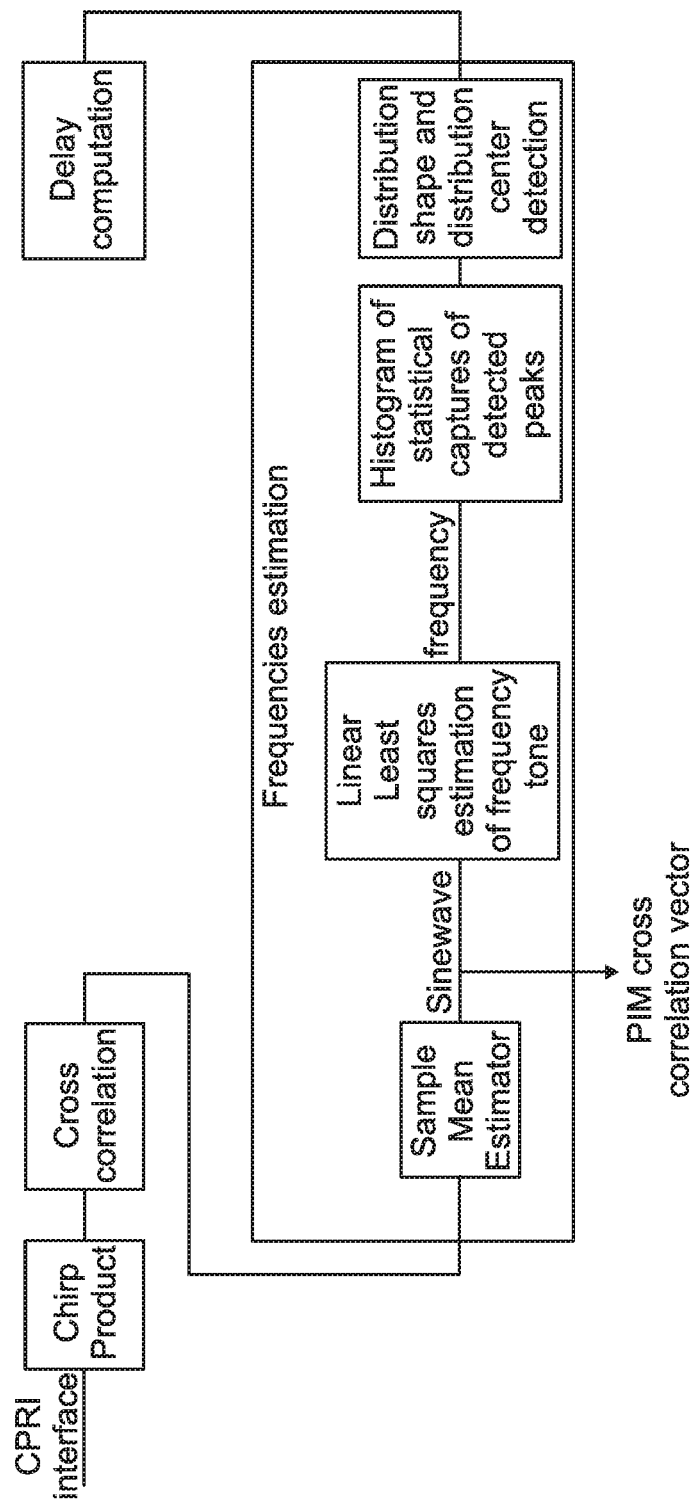
FIG. 7 is another alternate embodiment of a portion of the DSP chain in the tester of FIG. 2.

Step 2 uses the sample mean estimator (SME) plus frequency estimation based Delay estimator block diagram of FIG. 7 to estimate PIM cross correlation vector and PIM delay.

Step 3 aims to eliminate the contribution of PIM signal from PA/DAC saturation data captures (step 3 data capture). The PIM signal is eliminated by subtracting the step 2 PIM cross correlation vector from step 3 cross correlation vector as described in Step 3 block diagram of FIG. 8. Once the PIM signal is eliminated, the resulting data samples comprise the IM signal plus noise. To remove noise, these data are forwarded to SME (noise cleaning algorithm) plus frequency estimator resulting in the IM delay associated frequency. The delay computation block diagram converts the computed frequency into the IM delay timing.

Statistic may apply on the estimated frequency values to improve estimation reliability.

Figure 8:
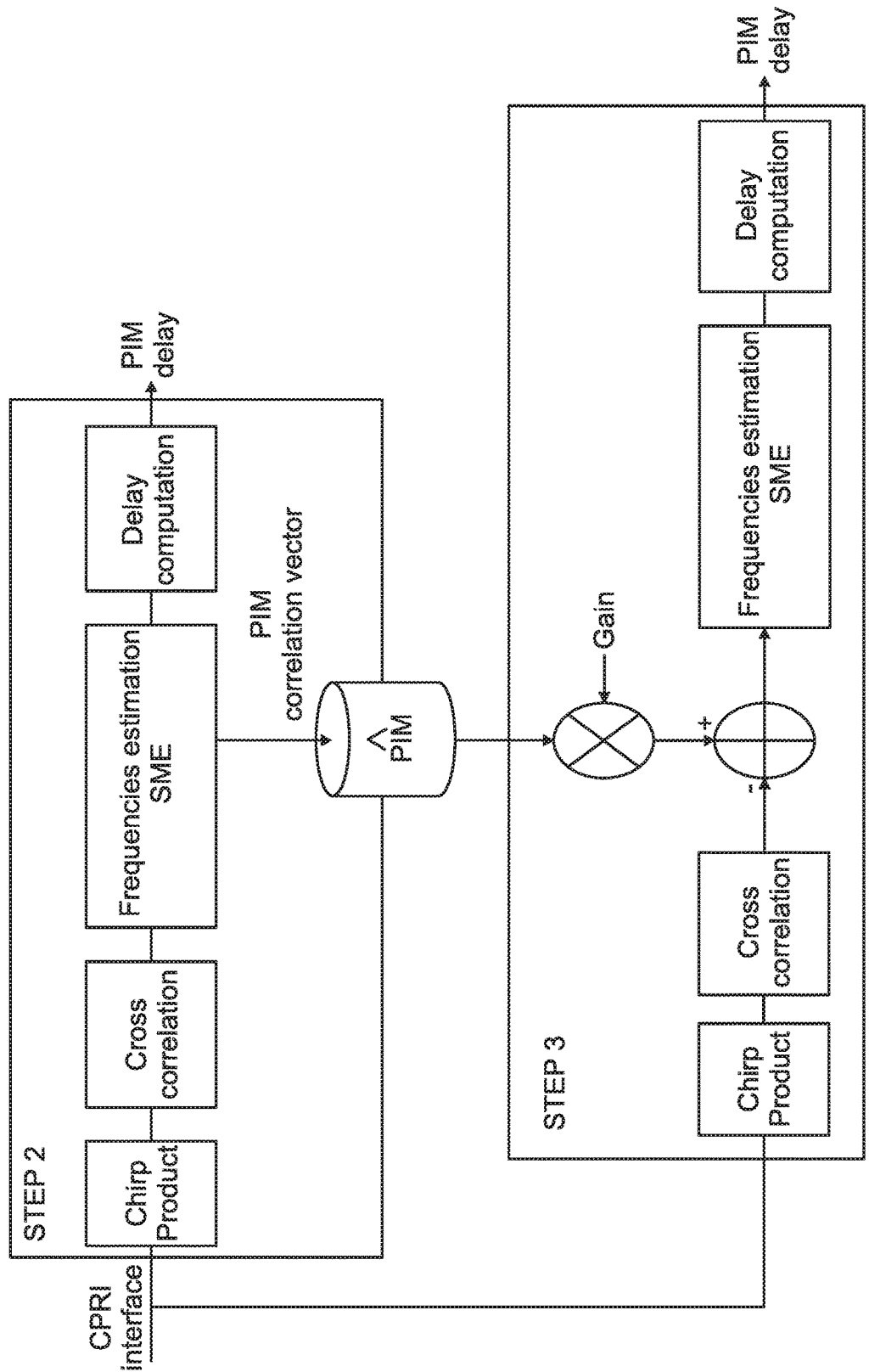
FIG. 8 is another alternate embodiment of a portion of the DSP chain in the tester of FIG. 2.

The step 2 and step 3 can be summarized in FIG. 8.

Because the SME algorithm is based on long term integration principle, it is sensitive to ADDA sampling jitter and local oscillator drift.

Frequency Estimation with High Sampling Rate (30.72 MHz)

Figure 9:
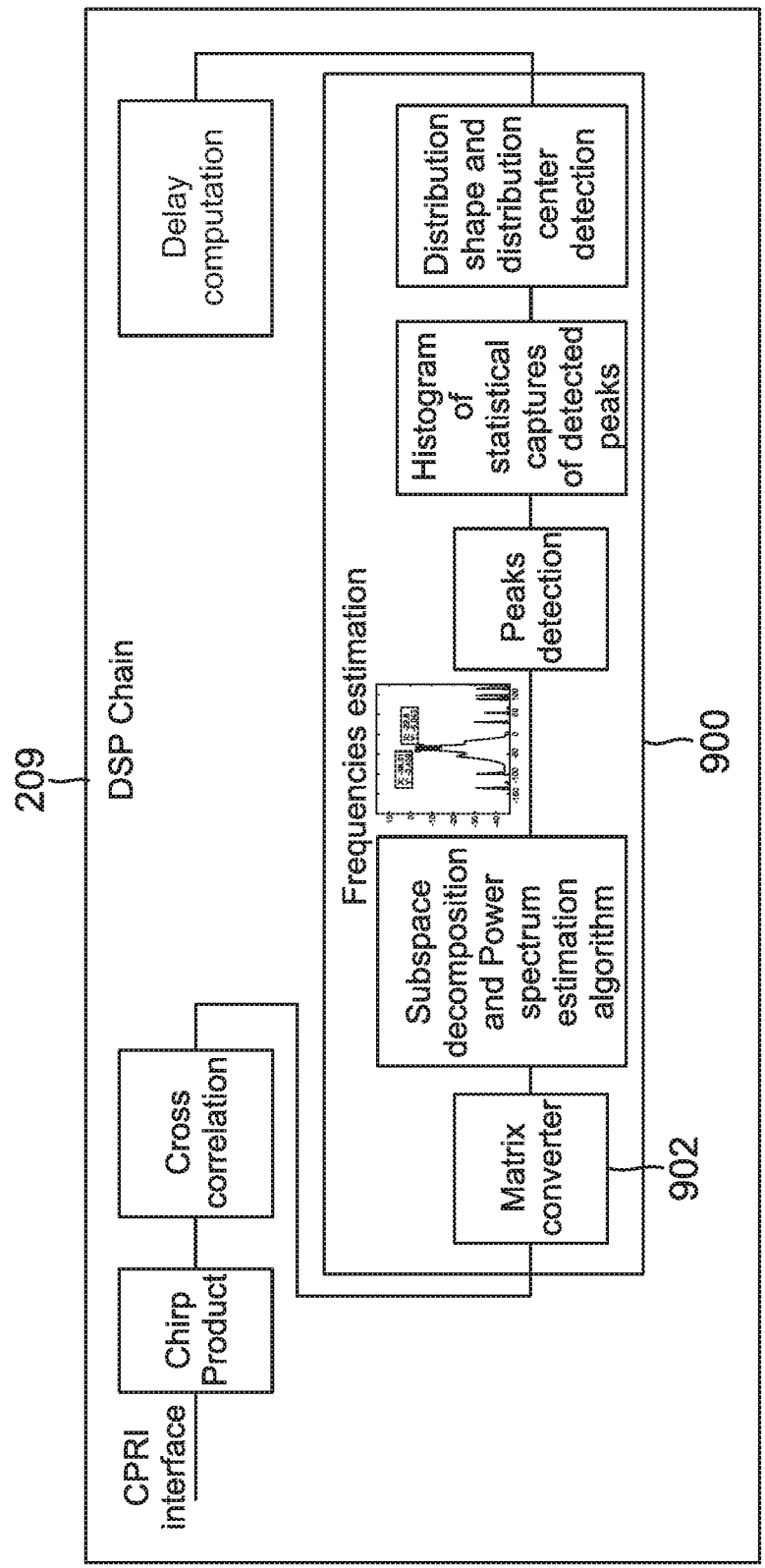
FIG. 9 is another alternate embodiment of a portion of the DSP chain in the tester of FIG. 2.

Under this condition several frequency tones (PIM sources) can be estimated in one step. The frequencies estimation process is detailed in FIG. 9.

In this embodiment, DSP chain 209 includes a frequency estimation circuit 900. Frequency estimation circuit 900 includes a matrix converter 902 that converts the cross correlation matrix to a Hermitian matrix formulation according to the following equation:

$$R=(R_{x_1x_2}+R_{x_1x_2}{}^H)/2 \quad (14)$$

It is assumed that the signal is interfered only with white Gaussian noise. As a result the Eigen vectors of signal sub-space are orthogonal to Eigen vectors of noise sub-space. The different sinewaves resulting from the chirp product are most of the time mixed together in one or more Eigen vector. Therefore, it is not possible to apply the previous method on each Eigen vector. A pseudo spectrum method can be applied here. The intended pseudo spectrum can be the method called MUSIC, or modified pseudo spectrum, Eigen Vector method, Eigen AIC, Eigen MDL, minimum variance spectral estimator.

Some tests show negative Eigen value, as a result it is recommended this vector shall have a constructive contribution into the spectrum estimation than a destructive behavior. As result in the formula of the EigenVector (EV) noise subspace frequency estimator an absolute operator applies on the Eigen values. The enhanced pseudo spectrum EV formula is therefore:

$$P_{EEV}(e^{jw}) = \frac{1}{\sum_{i=p+1}^{M} \frac{1}{|\lambda_i|} |e^H v_i|^2} \quad (15)$$

$P_{EEV}(e^{jw})$: is the enhance Eigen vector pseudo density spectrum.
M: the matrix correlation size.
p: is the number of vector in the signal sub-space.
$v_i$: is the Eigen vector 'i' (noise sub-space).
$e^H$: is the Hermitian reference complex exponential vector of angular frequency "w".

The resulting spectrum can be sum-up after each iteration to improve the estimation. As an alternative of the summation and if the number of PIM/IM is estimated, it is possible to build a histogram of the detected frequency.

The first significant peak in the histogram gives the relative delay frequency for the IM reflection (earliest arrived chirp). The next significant peaks give relative delay frequencies of the PIM reflections.

Distance Computation

Once the frequencies are extracted for the PIM and IM, the distance to the PIM source 103 can be determined. In all instances, the distance to the PIM source is computed from the relative frequencies as follows:

Relative delay of IM source: $\tau_{IM}=f_{IM}/m$
Relative delay of PIM source: $\tau_{PIM}=f_{PIM}/m$
Distance to PIM according: $(\tau_{PIM}-\tau_{PIM})/2*v$ Chirp Structure at Transmitter The chirp signal samples in the tester is built with sampling period that is higher than the time resolution necessary to recover accurate delay estimation. A commonly used chirp structure configuration corresponds to the signal shown in FIG. 10.

Assume one transmitted chirp that is captured at the tester with a sampling position that is not corresponding to the sampling position at chirp creation. A chirp product applied on it will not provide a constant frequency sinewave. In other words, the chirp product property is lost if the receive part does not sample it at the exact position the chirp was created.

In the system described above, if two reflected chirps are received with overlapping timing less than the baseband sampling period, the chirp product property will be lost. This deficiency will cause an unreliable estimation of delay spacing ($\tau 2-\tau 1$).

Figure 11:
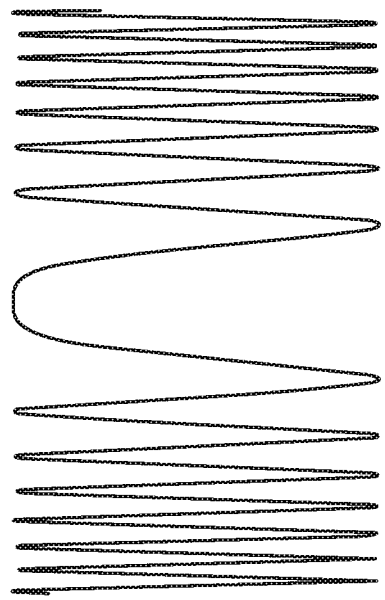
FIGS. 10 and 11 are illustrations of chirp signals.
Figure 10:
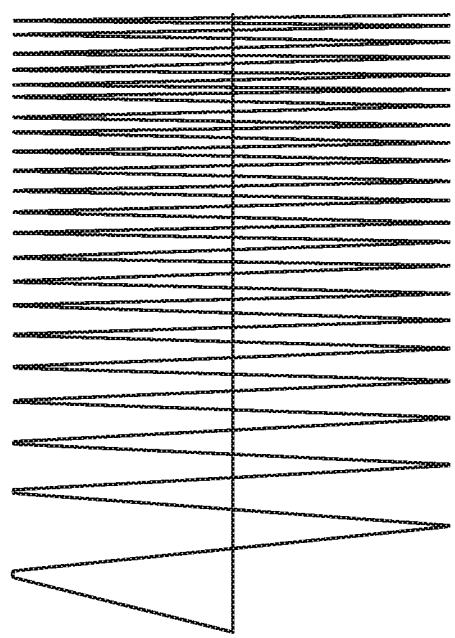

Instead of the commonly used configuration of FIG. 10, in one embodiment, the chirp wave in FIG. 11 is used. The chirp structure formula is unchanged:

$$\text{chirp}(n) = Ae^{\{j2\pi(f_i n + \frac{1}{2}mn^2)\}} \quad (16)$$

but the initial frequency shall be set to a negative value and the frequency change rate shall be positive. With a proper number of samples, the chirp product property is not altered from baseband sampling as the number of high frequency components are reduced. This chirp structure is used as the transmitted signal in the DL CPRI link. To keep the chirp product property the configuration parameters are:

The initial frequency is computed as follows:

$$f_i = -m \times \frac{chirpSize - 1}{f_s} \quad (17)$$

Where:

$$\text{chirp size is chirpSize=correlationMatrixSize}*2 \quad (18)$$

the change rate is $$m = \frac{1}{2 \times chirpSize}$$

to guaranty chirp product property integrity all along the chirp signal.

$f_t$: the initial frequency of the transmitted chirp signal
m: the frequency change rate of the chirp signal
$f_s$: the I/Q frequency sampling at the CPRI/OBSAI interface The correlation squared matrix size is recommended to be around 64×64.

Chirp Structure at Receiver

The chirp product operation on a received chirp signal will produce a sinewave. A reference chirp is used by the chirp product as indicated in (5). The reference chirp expression employed at the transmit chain differs from the one at the receive chain. Due to transmission in the RF followed by non-linear reflection, the chirp configuration is altered. Here only the third order reflection is considered. However, higher order reflections could exist with similar properties.

The modified reference chirp expression to apply at the receiver:

$$referenceChirp(n) = e^{\{j2\pi(f_r n - \frac{1}{2}mn^2)\}} \quad (19)$$

With the initial frequency equals:

$$f_r = 2 \times f_{CW} - f_t + 2f_{dl\_cw} - f_{dl\_chirp} - f_{ul} \quad (20)$$

Where:
$f_{CW}$: sinusoidal CW frequency
$f_t$: initial frequency of the transmitted chirp
$f_{dl\_chirp}$: LTE downlink carrier carrying the chirp signal
$f_{dl\_cw}$: LTE downlink carrier carrying the CW signal (if different from this used to carry the chirp)
$f_{ul}$: LTE uplink carrier carrying the reflected chirp Distance Determination Using Matched Filter Another category of algorithm that may address the delay estimation problem is the one based on matched filter. A predetermine sequence is employed that constitutes the matched filer coefficient. The targeted predetermined pattern can be a chirp signal, a PN sequence or a Zadoff Chu sequence. A correlation process is applied with the matched filter along the received samples. The correlation output results into a window of correlation peaks. The windows length corresponds to the pattern sequence length. Throughout the received process the correlation result may be sum-up to improve the detection performance.

Distance Determination Using Adapted Reflectometry

One issue with reflectometry method is its sensibility to phase rotation at the PIM reflection point. Prior to applying reflectometry, a correlation method can be used to estimate the phase rotation of the pattern sequence or modulated signal reflected at the PIM point. Once known, the received signal can be phase equalized to recover from the defective phase rotation. Then, the reflectometry method can apply to estimate the delay.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for determining the distance to a source of a passive intermodulation (PIM) product for a distributed base station, the method comprising:
   generating a test signal wherein the test signal comprises a chirp defined by:

$$chirp(n) = Ae^{\{j2\pi(f_t n + \frac{1}{2}mn^2)\}}$$

with an initial frequency ($f_t$) that is set to a negative value and a frequency change rate (m) is positive, A is a constant, and n is a discrete time index;
   transmitting the test signal on a front haul communication link between a baseband unit and a remote radio head of the distributed base station;
   receiving the PIM product as a reflected signal at the remote radio head;
   multiplying the reflected signal by a conjugate of the test signal to create a sinewave;
   determining a frequency of the sinewave; and
   determining the distance to the source of the PIM based on the determined frequency of the sinewave.

2. The method of claim 1, wherein generating the test signal comprises generating a chirp signal and a continuous wave (CW) signal.

3. The method of claim 1, wherein generating the test signal includes generating a PN sequence, a Zadoff-Chu sequence or any sequence that shows good correlation properties.

4. The method of claim 1, wherein transmitting the test signal comprises transmitting the test signal at a high enough power to generated an intermodulation (IM) product in a component of the remote radio head in order to estimate the RRH round trip delay and the delay of the front haul link.

5. The method of claim 1, wherein determining the distance to the source comprises determining round trip travel time between the remote radio head and the PIM source from the frequency of the reflected signal.

6. A method for determining the distance to a source of a passive intermodulation (PIM) product for a distributed base station, the method comprising:
    generating a test signal wherein the test signal comprises a chirp defined by:

$$\text{chirp}(n) = Ae^{\{j2\pi(f_t n + \frac{1}{2} m n^2)\}}$$

with an initial frequency ($f_t$) that is set to a negative value and a frequency change rate (m) is positive, A is a constant, and n is a discrete time index;
    transmitting the test signal on a front haul communication link between a baseband unit and a remote radio head of the distributed base station;
    receiving the PIM product as a reflected signal at the remote radio head;
    analyzing an Eigen component of the reflected signal; and
    determining the distance to the source of the PIM based on the analysis of the Eigen component.

7. The method of claim 6, wherein analyzing an Eigen component comprises:
    multiplying the reflected signal by a conjugate of the test signal to create a sinewave; and
    determining a frequency of the sinewave, wherein the distance to the source of the PIM is based on the frequency of the sinewave.

8. A tester for determining the distance from a distributed base station to a source of passive intermodulation (PIM), the tester comprising:
    a signal generator configured to be coupled to a front haul communication link between a baseband unit and a remote radio head of the distributed base station, wherein the signal generator is configured to generate a test signal, wherein the test signal comprises a chirp defined by:

$$\text{chirp}(n) = Ae^{\{j2\pi(f_t n + \frac{1}{2} m n^2)\}}$$

with an initial frequency ($f_t$) that is set to a negative value and a frequency change rate (m) is positive, A is a constant, and n is a discrete time index, and to transmit the test signal on the front haul communication link;
    a digital signal processor, configured to be coupled to the front haul communication link, wherein the digital signal processor is operable to cause the tester to do the following:
        receiving the PIM product as a reflected signal at the remote radio head;
        multiplying the reflected signal by a conjugate of the test signal to create a sinewave;
        determining a frequency of the sinewave; and
        determining the distance to the source of the PIM based on the determined frequency of the sinewave.

9. The tester of claim 8, wherein the digital signal processor includes a chirp product module that is configured to multiply the reflected signal by a conjugate of a reference chirp signal.

10. The tester of claim 9, wherein the digital signal processor includes a cross correlation module, coupled to the chirp product module, that is configured to apply cross correlation to the sinewave from the chirp product module.

11. The tester of claim 10, wherein the digital signal processor includes a frequency estimation circuit, coupled to the cross correlation module, that is configured to determine the frequency of the sinewave.

12. The tester of claim 11, wherein the frequency estimation circuit includes:
    an Eigen decomposition module, configured to separate the output of the cross correlation module into a noise subspace and a signal subspace;
    a vector extractor, coupled to the Eigen decomposition module, configured to extract a first vector that corresponds to the signal subspace and at least one vector corresponding to the noise subspace; and
    a least square estimator, coupled to the vector extractor, configured to extract the frequency of the first vector.

13. The tester of claim 11, wherein the digital signal processor further comprises a summation module that is adapted to sum at least two sample bunches of signals received at the digital signal processor.

* * * * *